(12) United States Patent
Marshall

(10) Patent No.: US 10,294,008 B2
(45) Date of Patent: May 21, 2019

(54) CONTAINER HAVING SIDEWALL WITH RING-SHAPED SHAPING

(71) Applicant: Huhtamäki Oyj, Espoo (FI)

(72) Inventor: Neil Marshall, Fareham (GB)

(73) Assignee: HUHTAMÄKI OYJ, Espoo (FI)

( * ) Notice: Subject to any disclaimer, the term of this patent is extended or adjusted under 35 U.S.C. 154(b) by 51 days.

(21) Appl. No.: 15/697,329

(22) Filed: Sep. 6, 2017

(65) Prior Publication Data

US 2018/0057247 A1 Mar. 1, 2018

Related U.S. Application Data

(62) Division of application No. 13/382,862, filed as application No. PCT/EP2010/004071 on Jul. 6, 2010, now Pat. No. 9,771,206.

(30) Foreign Application Priority Data

Jul. 6, 2009 (DE) .................. 10 2009 026 108
Dec. 4, 2009 (DE) .................. 10 2009 044 722
Apr. 9, 2010 (DE) .................. 10 2010 016 390

(51) Int. Cl.
*B65D 3/22* (2006.01)
*B31F 1/10* (2006.01)
(Continued)

(52) U.S. Cl.
CPC ..... *B65D 81/3876* (2013.01); *A47G 19/2288* (2013.01); *B31F 1/0038* (2013.01); *B31F 1/10* (2013.01); *B65D 1/265* (2013.01); *B65D 3/22* (2013.01); *B31B 50/254* (2017.08); *B31B 50/256* (2017.08); *B31B 50/28* (2017.08); *B31B 50/81* (2017.08); *B31B 2105/00* (2017.08); *B31B 2105/0022* (2017.08); *B31B 2110/10* (2017.08);
(Continued)

(58) Field of Classification Search
CPC . B65D 3/22; B65D 3/00; B65D 1/265; B65D 81/3876; B65D 81/3881; B65D 81/3865; B65D 81/3869
USPC ............ 220/62.19–62.2, 651–651, 669–674; 229/400–405
See application file for complete search history.

(56) References Cited

U.S. PATENT DOCUMENTS 1,091,526 A 3/1914 Moore
1,137,039 A 4/1915 Weber
(Continued)

FOREIGN PATENT DOCUMENTS

AT 54111 B 6/1912
CN 1489541 A 4/2004
(Continued)

*Primary Examiner* — Mollie Impink
(74) *Attorney, Agent, or Firm* — Husch Blackwell LLP

(57) ABSTRACT

A cup having a bottom and a sidewall attached to the bottom, wherein the sidewall preferably comprises a rolled rim at its upper edge opposite to the bottom, wherein the sidewall comprises a single layer or a plurality of layers, wherein at least one of the layers is produced from a paper or carton material, wherein at least one shaping is shaped into at least one of the layers of the sidewall, wherein the shaping is at least partially ring-shaped, wherein the shaping extends at least partially over the perimeter of the sidewall, wherein the shaping is inwardly or outwardly directed, wherein the shaping is compressed in height such that an edge of the shaping touches an opposite segment of the shaping and/or that both edges of the shaping touch each other and are joined together.

10 Claims, 8 Drawing Sheets

(51) Int. Cl.
  *B65D 81/38* (2006.01)
  *A47G 19/22* (2006.01)
  *B31F 1/00* (2006.01)
  *B65D 1/26* (2006.01)
  *B31B 50/28* (2017.01)
  *B31B 50/81* (2017.01)
  *B31B 105/00* (2017.01)
  *B31B 120/70* (2017.01)
  *B31B 50/25* (2017.01)
  *B31B 110/10* (2017.01)
  *B31B 120/00* (2017.01)
  *B31B 120/50* (2017.01)

(52) U.S. Cl.
  CPC ... *B31B 2120/002* (2017.08); *B31B 2120/501* (2017.08); *B31B 2120/70* (2017.08); *B65D 81/3881* (2013.01); *Y02W 90/12* (2015.05); *Y02W 90/13* (2015.05)

(56) References Cited

U.S. PATENT DOCUMENTS

| | | | |
|---|---|---|---|
| 1,571,208 A | 2/1926 | Lindgren |
| 2,028,566 A | 1/1936 | Seipel et al. |
| 2,090,435 A | 8/1937 | Waldvogel |
| 2,139,143 A | 12/1938 | Wiswell |
| 2,266,828 A | 12/1941 | Sykes |
| 2,622,051 A | 12/1952 | Hermanson et al. |
| 2,905,350 A | 9/1959 | Edwards |
| 3,079,027 A | 2/1963 | Edwards |
| 3,157,335 A | 11/1964 | Maier |
| 3,186,850 A | 6/1965 | Anthony |
| 3,223,305 A | 12/1965 | Edwards |
| 3,288,340 A | 11/1966 | Shapiro et al. |
| 3,372,830 A | 3/1968 | Edwards |
| 3,456,860 A | 7/1969 | Janninck |
| 3,472,418 A | 10/1969 | Ullman |
| 3,495,736 A | 2/1970 | Ragettli |
| 3,512,677 A | 5/1970 | Kovac |
| 3,927,766 A | 12/1975 | Day |
| 4,040,537 A | 8/1977 | Edwards |
| 4,156,483 A | 5/1979 | Day |
| 4,237,939 A | 12/1980 | Schwartz |
| 4,324,340 A | 4/1982 | Belokin, Jr. |
| 4,368,818 A | 1/1983 | Day et al. |
| 4,420,081 A | 12/1983 | Dart |
| 4,548,349 A | 10/1985 | Tunberg |
| 4,609,113 A | 9/1986 | Seki |
| 4,657,141 A | 4/1987 | Sorensen |
| 4,993,580 A | 2/1991 | Smith |
| RE33,608 E | 6/1991 | Sorensen |
| 5,125,512 A | 6/1992 | O'Leary |
| 5,397,021 A | 3/1995 | Usui |
| 5,415,339 A | 5/1995 | Howard |
| 5,490,631 A | 2/1996 | Iioka et al. |
| 5,669,553 A | 9/1997 | Smith |
| 5,725,916 A | 3/1998 | Ishii et al. |
| 5,766,709 A | 6/1998 | Geddes et al. |
| 5,769,311 A | 6/1998 | Morita et al. |
| 5,772,111 A | 6/1998 | Kirsch |
| 5,820,016 A | 10/1998 | Stropkay |
| 5,911,360 A | 6/1999 | Schellenberg |
| 5,950,917 A | 9/1999 | Smith |
| 5,964,400 A | 10/1999 | Varano et al. |
| 6,039,682 A | 3/2000 | Dees et al. |
| 6,186,394 B1 | 2/2001 | Dees et al. |
| 6,193,098 B1 | 2/2001 | Mochizuki et al. |
| 6,224,954 B1 | 3/2001 | Mitchell et al. |
| 6,253,995 B1 | 7/2001 | Blok et al. |
| 6,260,756 B1 | 7/2001 | Mochizuki et al. |
| 6,287,247 B1 | 9/2001 | Dees et al. |
| 6,497,338 B1 | 12/2002 | Stolzman |
| 6,536,657 B2 | 3/2003 | Van Handel |
| 6,554,154 B1 | 4/2003 | Chauhan et al. |
| 6,586,075 B1 | 7/2003 | Mitchell et al. |
| 6,588,654 B2 | 7/2003 | Nakashima |
| 6,598,786 B1 | 7/2003 | Guo |
| 6,663,926 B1 | 12/2003 | Okushita et al. |
| 6,718,664 B2 | 4/2004 | Williams |
| 6,729,534 B2 | 5/2004 | Van Handel |
| 6,926,197 B2 | 8/2005 | Hed et al. |
| 7,175,585 B2 | 2/2007 | Okushita et al. |
| 7,281,649 B2 | 10/2007 | Pyper, Jr. |
| 7,389,720 B2 | 6/2008 | Haverstock |
| 7,458,504 B2 | 12/2008 | Robertson et al. |
| 7,464,586 B2 | 12/2008 | Kabe et al. |
| 7,464,857 B2 | 12/2008 | Van Handel |
| 7,600,669 B2 | 10/2009 | Van Handel |
| 7,618,359 B2 | 11/2009 | Okushita et al. |
| 7,677,435 B2 | 3/2010 | Stahlecker |
| 7,699,216 B2 | 4/2010 | Smith et al. |
| 7,922,071 B2 | 4/2011 | Robertson et al. |
| 7,993,254 B2 | 8/2011 | Robertson et al. |
| 8,006,861 B2 | 8/2011 | Kim |
| 8,146,796 B2 | 4/2012 | D'Amato |
| 8,360,263 B2 | 1/2013 | D'Amato |
| 2002/0130170 A1 | 9/2002 | Nakashima |
| 2003/0015582 A1 | 1/2003 | Van Handel |
| 2003/0121189 A1 | 7/2003 | Williams |
| 2003/0121963 A1 | 7/2003 | Van Handel |
| 2004/0188450 A1 | 9/2004 | Marshall et al. |
| 2004/0226948 A1 | 12/2004 | Okushita et al. |
| 2005/0040218 A1 | 2/2005 | Hinchey et al. |
| 2005/0258225 A1 | 11/2005 | Martin |
| 2006/0027640 A1 | 2/2006 | Smith et al. |
| 2007/0117702 A1 | 5/2007 | Okushita et al. |
| 2007/0228134 A1 | 10/2007 | Cook et al. |
| 2008/0029588 A1 | 2/2008 | Messerschmid et al. |
| 2008/0087715 A1 | 4/2008 | Robertson et al. |
| 2008/0090711 A1 | 4/2008 | Robertson et al. |
| 2008/0121681 A1 | 5/2008 | Wiedmeyer |
| 2008/0128481 A1 | 6/2008 | Robertson |
| 2008/0290103 A1 | 11/2008 | Robertson et al. |
| 2009/0321460 A1 | 12/2009 | Kim |
| 2009/0321508 A1 | 12/2009 | Fu et al. |
| 2011/0272459 A1 | 11/2011 | Hoekstra et al. |
| 2017/0119183 A1 | 5/2017 | Bonney et al. |

FOREIGN PATENT DOCUMENTS

| | | |
|---|---|---|
| DE | 1432189 A1 | 2/1969 |
| DE | 8601943 U1 | 3/1986 |
| DE | 102004056932 A1 | 5/2006 |
| DE | 69937440 T2 | 8/2008 |
| DE | 102008014878 A1 | 9/2009 |
| DE | 102009044772 A1 | 6/2011 |
| DE | 102010016390 A1 | 10/2011 |
| GB | 1480545 | 7/1977 |
| GB | 206199 A | 5/1981 |
| GB | 2061699 A | 5/1981 |
| GB | 2075462 A | 11/1981 |
| NZ | 183959 A | 11/1980 |
| WO | 9911526 A1 | 3/1999 |
| WO | 2007054179 A2 | 5/2007 |
| WO | 2008009371 A1 | 1/2008 |

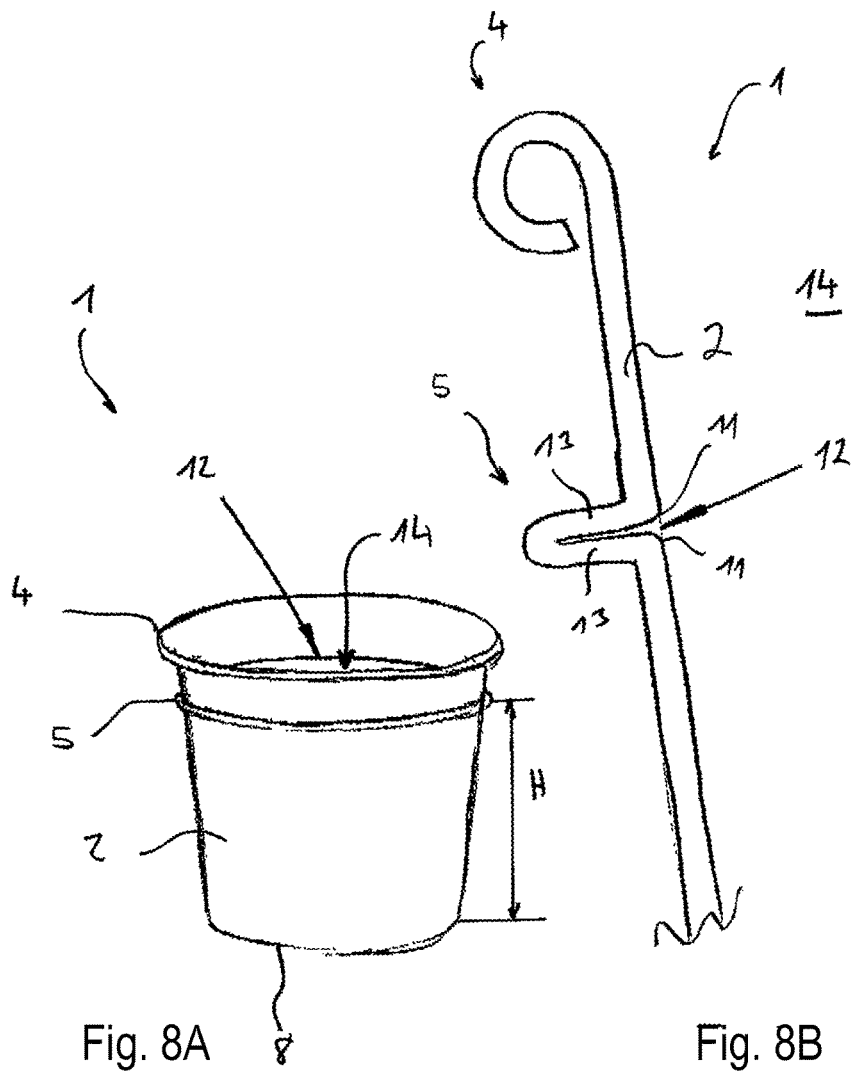

CONTAINER HAVING SIDEWALL WITH RING-SHAPED SHAPING

CROSS-REFERENCE TO RELATED APPLICATIONS

This Application is a Divisional of and claims priority to U.S. application Ser. No. 13/382,862, filed on Jan. 1, 2012 to Neil Marshall, entitled "Container Having Sidewall with Ring Shaped Shaping," now issued as U.S. Pat. No. 9,771,206, which claims priority to PCT Patent Application No. PCT/EP2010/004071, filed on Jul. 6, 2010 to Neil Marshall, entitled "Container Having Ring Shaped Shaping," which claims priority to German Patent Application Nos. DE 10 2009 026 108.7 filed on Jul. 6, 2009, DE 10 2009 044 772.5 filed on Dec. 4, 2009, and DE 10 2010 016 390.2 filed on Apr. 9, 2010. The entire disclosures of the above references are incorporated herein by reference.

FIELD OF THE INVENTION

The present invention relates to a process for the production of a container, for example a cup having a bottom and a sidewall attached to the bottom, wherein the sidewall preferably comprises a rolled rim at its upper edge opposite to the bottom. The container comprises a single or a plurality of sidewalls, wherein at least one of the sidewalls is made from a paper material, a plastic material, PLA, a renewable and/or a biodegradable material and/or any other comparable material or a combination thereof.

BACKGROUND OF THE INVENTION

Paper cups are well known in the prior art, wherein all cups known in the prior art so far have the drawback to feature only a poor rigidity. Such cups have the problem to be very unstable, especially in the region of the upper edge, so that they can easily be pressed together.

In the past, due to this drawback the used material thickness had to exceed a lower limit. In order to provide a sufficiently high rigidity a comparatively thick material had to be used.

SUMMARY OF THE INVENTION

The object of the present invention is to suggest a process and a container produced by said process, wherein the container comprises a high inherent rigidity.

According to the present invention, this object is achieved by providing a shaping, for example an embossment, in the sidewall, wherein the shaping extends at least partially over the perimeter of the sidewall, wherein the shaping is inwardly and/or outwardly directed, wherein the shaping is compressed in its height.

The disclosure of this embodiment also applies to other embodiments or the present invention and vice versa.

Due to the compressed shaping, for example an embossment, the cup can only be pressed together in case a very high force is applied to the cup.

The present invention relates to a container. Particularly, the container is a cup, in which beverages, especially hot beverages such as coffee or tea or food, especially soup, mash or the like, can be served. This container is preferably made of paper, thick paper, cardboard, fiber-materials, plastic-material, PLA, materials made from renewable and/or biodegradable raw materials or a combination thereof. More preferably, the material is plastically deformable, for example embossable. All parts of the inventive containers are made from this material, whereas the individual parts of the container can be made from different materials. Especially the surfaces of the parts of the container that are subjected to a liquid and/or vapor are preferably provided with means, especially a coating, an impregnation, a film or the like which makes these parts at least temporarily resistant against for example humidity, water, aqueous solutions, oil and/or fat or a combination thereof. Preferably the above mentioned means are also heat sealable.

The container according to this present invention comprises a sidewall, which is preferably conically shaped and which more preferably has at its upper end a rolled rim. The sidewall is preferably made from a flat segment, which is subsequently formed, preferably rolled, into its conical shape. Preferably at its lower end, the sidewall is connected to a bottom in order to close the container at the base. The bottom is preferably a separate part which is attached, more preferably glued or heat sealed to the lower end of the sidewall of the container. The sidewall and the base define a filling-volume, which can be filled with a product.

This shaping can be produced by any technique known by a person skilled in the art, e.g. by folding or any other method of plastic deformation. Preferably, the shaping is inserted into the flat segment before it is formed, e.g. rolled into the final shape of the sidewall. More preferably, the shaping is an embossment, which is produced for example by applying locally pressure to the sidewall and deforming the material of the sidewall plastically. The shaping can have any shape known by a person skilled in the art. However, preferably, it is compressible, at least partially, especially in case an axial-force is applied to the sidewall. Preferably the shaping is U-shaped or has partially the shape of a segment of a circle. The shaping can be directed inwardly, i.e. towards the filling-volume of the container and/or outwardly, i.e. away from the filling-volume of the container, whereas an outwardly directed shaping is preferred, because it does not restrict the filling volume of the inventive container. The shaping can alternate between an inward direction and an outward direction. This alternation is preferably harmonic. The shaping is preferably formed into at least one layer of the sidewall such that an edge of each shaping touches an opposite segment of the same shaping and/or that both edges of each shaping touch each other and are joined.

According to a preferred embodiment of the present invention, the shaping, the shaping-dies and/or the compressing tools are capable to generate a void during its formation and/or compression. By means of such a void volume it is possible to realize a very good insulating effect.

According to the present invention, it is, furthermore, preferred that the shaping, the shaping-dies and/or the compressing tools provide capability to generate a flat profile after the compression. Thereby, an exceptionally high rigidity is realized. Besides, the flat profile has the advantage that it can be used as a stop or spacer.

According to a preferred embodiment of the present invention, the shaping is shaped such that a rib is formed during to the compression. By means of a rib the rigidity of the cup can be maximized such that an undesirable crushing of the cup is avoided.

According to the present invention it is, furthermore, preferred that the shaping is heated up for example by means of ultrasonic sound, laser or any other heat sources and, thereby, simplify for the compression. It has turned out that a heated shaping can be compressed with little effort.

According to a preferred embodiment of the present invention, a coating is applied at least in the region of the edges of the shaping, wherein the coating preferably comprises a heat-sealable material to join the edges.

The coating is, e.g. polyethylene. Thereby, the coated region is not only impermeable to fluids but it is also possible to seal for example the edges of the compressed shaping together. Preferably, the sealable material is produced from renewable resources. Furthermore, it is preferred that the coating is applied to the entire surface or to parts of the surface, at least the surface that is exposed to water, a watery substance, oil and/or humidity. A coating that is applied on the entire surface can also provide a protection against fluids and moisture.

According to a preferred embodiment of the present invention, the shaping is compressed such that the edges are closely spaced to each other and/or lie on top of each other and preferably form a flat surface.

Due to this compression and the joining an even surface of the sidewall between the edges of the shaping is realized. If these joined edges are formed on the inner surface of the cup, it will be avoided that a filling material, especially a liquid, percolates into the compressed shaping.

According to the present invention, it is preferred that the compressed shaping forms a rib sticking out inwardly or outwardly, wherein the rib comprise void volumes or wherein the ribs form a flat surface. Thereby, it is possible that the shaping can be used for single-sidewall-cups or can be used for the inner-sidewall or the outer-sidewall of multi-sidewall-cups.

Thereby, it is possible that the shaping can be used for single-sidewall-cups or can be used for the inner-sidewall or the outer-sidewall of multi-sidewall-cups.

According to a further embodiment of the present invention, it is preferred that the compressed shaping serves as insulation or as a spacer for another sidewall, preferably an even sidewall. Thereby, it is possible to achieve an excellent insulation that otherwise could only be realized in extremely cost-intensive process steps.

According to the present invention, it is, furthermore, preferred that the compressed shaping increases the rigidity of the sidewall. Thereby, it is possible that the sidewall is exceptionally solid and rigid without the need to considerably increase the amount of used material.

According to the present invention, it is, furthermore, preferred that the compressed shaping forms a high-frictional grip area.

Thereby, it is possible that even for a single-sidewall cup a well-insulated and grippable grip area is realized, wherein a slipping is effectively avoided due to the surface property and surface texture.

According to the present invention, it is furthermore preferred that the cup is made from a plastic-, a paper material, carton and/or any other fiber material that can be embossed and compressed.

According to the present invention, it is furthermore preferred that the shapings are formed as circumferential rings, ring segments, spirals, spiral segments or the like. Thereby, it is possible to realize many different optical and technical embodiments.

According to a further embodiment of the present invention, it is preferred that an shaping being at least partially circumferential is arranged close to the bottom and serves as stacking support, wherein the shaping is preferably inwardly directed.

Using such a stacking support, that is usually arranged on the sidewall, it is possible to avoid that a plurality of cups stacked into one another are pushed together in such a way that they can be hardly or not separated from each other anymore. Such a stacking support is especially advantageous, if a stack of cups is intended to be separated from each other automatically. According to the present invention, it is preferred that the upper edge or the lower edge of this shaping is pulled further inwards than the other edge. Thereby, it is possible to form a ledge which leads to a tapering of the cup.

According to a further embodiment of the present invention, it is preferred that a plurality of shapings are used which are arranged side by side in vertical direction of the container, wherein towards the bottom the shapings have preferably a smaller radial extension. Thereby, the stackability is significantly improved and/or the stacking height is reduced.

According to the present invention, it is furthermore preferred that the cup comprises a second sidewall, wherein the second sidewall can be single-layered or multi-layered, wherein the second sidewall is wrapped around the first sidewall or wherein the second sidewall is pulled over the first sidewall. The two sidewalls are preferably attached to each other, for example by gluing, sealing or mechanically. Thereby, it is possible that the outer sidewall snaps into place and is, thereby, tightly attached to the inner sidewall.

According to another inventive or preferred embodiment of the present invention, a container with a first sidewall and a bottom is provided, which comprises a fill line which is a shaping. The disclosure of this embodiment also applies to other embodiments or the present invention and vice versa.

According to this embodiment of the present invention, the first sidewall comprises a fill line, which is a shaping. This shaping is a plastic shaping, preferably an embossment, in the first sidewall. Preferably, this shaping extends at least partially, preferably entirely, around the inner or outer circumference of the first sidewall. The shaping can be directed inwardly, i.e. towards the filling-volume of the container or outwardly, i.e. away from the filling-volume of the container, whereas an outwardly directed shaping is preferred, because it does not restrict the filling volume of the inventive container. The height of the shaping at the sidewall will be chosen such, that the filling line represents a desired filling volume. The inventive container can comprise two or more shapings and thus two or more filling lines, for example a lower one which indicated a volume, which has to be filled with a powder and/or pellets and a higher one that indicate the amount of liquid that has to be added to the powder and/or pellets. The shaping can extend around the entire circumference or can extend only over a segment of the circumference of the sidewall of the container.

This shaping can be produced by any technique known by a person skilled in the art, e.g. by folding or any other method of plastic deformation. Preferably, the shaping is inserted into a cardboard segment before it is formed, e.g. rolled into the final shape of the sidewall. More preferably, the shaping is an embossment, which is produced for example by applying locally pressure on the sidewall and deforming the material of the sidewall plastically. The shaping can have any shape known by a person skilled in the art. However, preferably, it is compressible, at least partially, especially in case an axial-force is applied to the sidewall. Preferably the shaping is U-shaped or has partially the shape of a segment of a circle.

In a preferred embodiment, the shaping is compressed in its height extension, i.e. after the compression of the shaping, the sidewall is reduced in its height. Due to the compression of the shaping in its height, preferably the radial extension of the shaping increases at least partially. More preferably, the compression of the shaping is elastic, i.e. as soon as the deformation force is removed, the shaping tries to resume, at least partially, its original shape. Thus, in this preferred embodiment of the present invention, the deformed shaping functions as a spring.

In another preferred embodiment of the present invention, the flanges and/or edges of the shaping are bonded, preferably glued or sealed, together after they have been compressed. This preferred embodiment of the present invention has the advantage that the shaping is at least partially closed and that the fill line appears as a line with a small width.

In another preferred embodiment, the inventive container comprises a second sidewall, which is preferably arranged around the first sidewall. This second sidewall is preferably conically shaped and is more preferably made from a flat cardboard segment, which is subsequently formed, especially rolled, around the circumference of the first sidewall. Preferably, the second sidewall is connected to the first sidewall and/or the base at one, preferable two or more connection points or connection areas. This connection can be purely mechanical, based on adhesion or a combination thereof. Preferably, the two sidewalls are glued or sealed together.

The shaping functions in this preferred embodiment preferably also a spacer between the first and the second sidewall, especially to maintain an air gap between the first and the second sidewall, even if the second sidewall is subjected to pressure, for example by the hand of a user.

The second sidewall can be utilized to maintain the shapings in their compressed state, so that the fill line appears as a fine line. Thereto, the two sidewalls are preferably connected in two or more different areas, especially at two or more different heights of the container. The shaping itself or other parts of the first sidewall can be connected to the second sidewall. The second sidewall hinders the compressed shaping to resume its original shape after the compression force has been released.

The inventions are now explained in further detail according to the figures. This explanation does not limit the scope of protection. The explanation apply to all inventions, respectively.

DESCRIPTION OF THE SEVERAL VIEWS OF THE DRAWING

FIG. 8A shows a perspective view of a first embodiment of an inventive container.

FIG. 8B shows a partial cutaway side view of the inventive container of FIG. 8A.

DETAILED DESCRIPTION OF THE INVENTION

Figure 1:
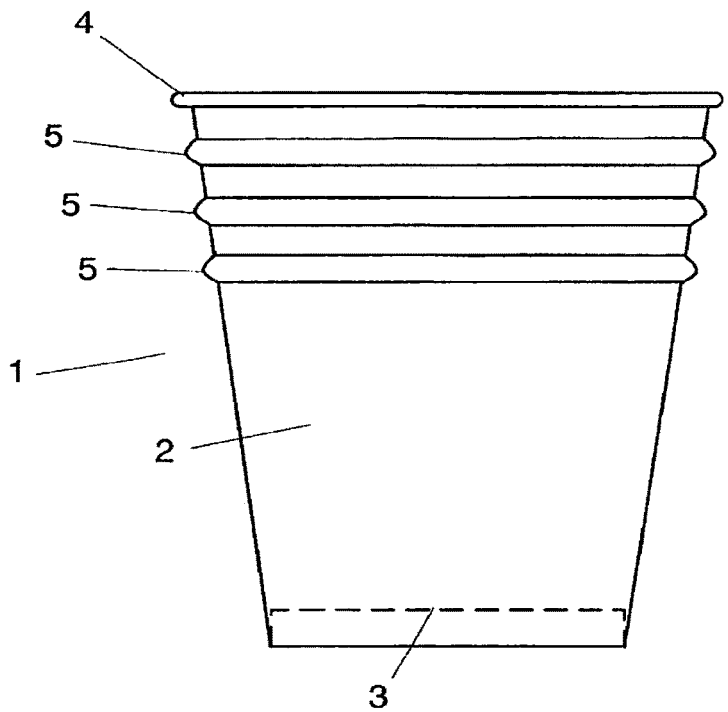
FIG. 1 shows a cup comprising three outwardly directed shapings.
Figure 2:
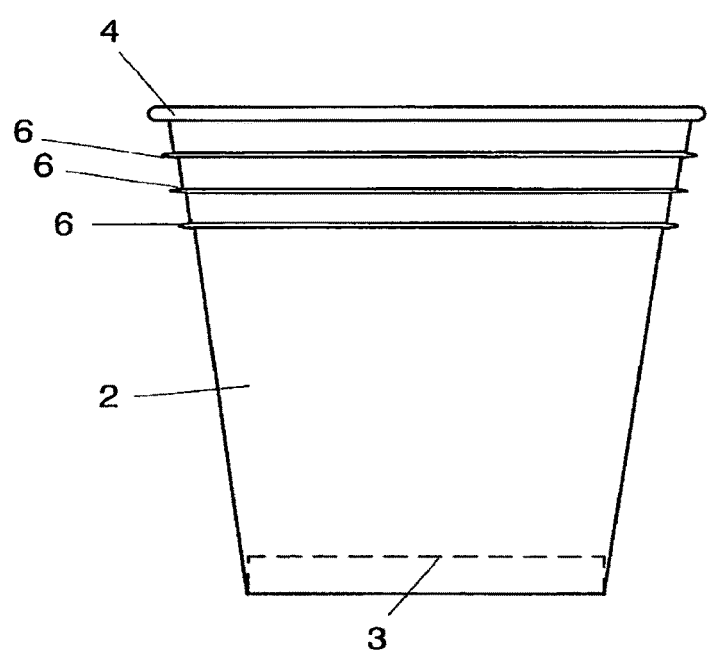
FIG. 2 shows a cup according to FIG. 1 with compressed shapings.

FIG. 1 shows a cup 1 with a sidewall 2 and a bottom 3. The upper edge of the sidewall 2 opposite to the bottom 3 comprises a rolled rim 4. According to the illustrated embodiment, three outwardly directed and circumferential shapings 5 are arranged below the rolled rim 4. The shapings 5 are embossments. According to the present invention, the shapings 5 are compressed in height. In the present case the compressed shapings form outwardly directed flat rings 6 as illustrated in FIG. 2. The person skilled in the art understands that there can be more or less shapings 5 and that the shapings can be directed inward and/or outwardly. The sidewall 2 is made of paper material or carton and comprises a coating of polyethylene 7 on the inner surface. During the compression of the shapings 5 preferably at least this coating 7 is heated up so that, in the region of the edges 8 of the shapings 5, the edges 8 of each shaping 5 are heat-sealed together. It is possible to also use other well-known sealable materials, such as sealable materials produced from renewable resources, for the coating 7. The coating 7 can be applied on the entire surface or on parts of the surface of the sidewall of the container. By applying a coating 7 on the entire surface it is possible to avoid that the sidewall 2 is moistened by liquid filling material. The edges 8 can also be glued or mechanically attached to each other.

Furthermore, it is preferred that the sidewall 2 is at least partially made of plastic, PLA and/or renewable and/or biodegradable resources.

Due to the bonding of the edges 8 it is avoided that the shapings 5 which are compressed to rings 6 reopen. Moreover, a comparatively even surface is also realized in the region of the rings 6 on the inner surface of the cup 1. It is avoided that filling material, for example a beverage like coffee tea or a cold drink or a food like soup, percolates into the rings 6.

Furthermore, the rings 6 are, thereby, hermetically sealed. During the compression, the rings 6 are usually not pressed together completely flat so that a void volume 9 is formed inside the rings 6. Besides, it is preferred that the rings 6 are pressed together completely flat by means of an appropriate compressing tool.

The rings 6 stiffen the sidewall 2 of the cup 1. An unintentional compression while holding the cup 1 is avoided. Due to this constructively increased rigidity it is, furthermore, possible to reduce the material thickness of the sidewall 2. Moreover, it is possible to use a softer material.

The rings 6 not only stiffen the sidewall 2 but also serve as a very good insulation, especially for single-sidewall-cups 1. The void volumes 9, thereby, serve as very good heat insulation. Thereby, it is possible to comfortably hold cups filled with hot or cold beverages. Besides, due to the texture formed by the rings 6 a very good slip resistance is provided. It is assured that the cup 1 does not slip unintentionally from the hands of a user.

The rings 6 can also serve as spacer for another sidewall 2. For example, it is possible that the sidewall comprises a second preferably outer sidewall. Three or more sidewallconstructions are also preferred. Furthermore, it is possible that both the inner sidewall and the outer sidewall comprise shapings 5 and/or rings 6. Furthermore, it is preferred that, e.g., the rings of the outer sidewall are inwardly directed and the rings of the inner sidewall are outwardly directed.

The joint of the edges 8 cannot only be realized by hot sealing, but also by bonding or the like. For this purpose, it is possible to apply a hot or cold glue in the region of the edges 8, wherein the hot or cold glue generates the joint during or after the compression. A combination of sealable material and glue is also preferred.

By using an excess of sealable material and/or glue it is possible to realize an additional smoothing of the junction of two edges 8.

To compress the shapings 5 it is possible to heat up the shaping using, e.g., ultrasonic sound, laser or other heat sources. The forces required for the compression can, thereby, be reduced. Furthermore, a sealable material is already softened so that a joint is generated as soon as two edges 8 touch each other.

Preferably, prints or figurations can be applied on the outside of the cup 1.

Preferably the shapings 5 have 3 height and 2 mm depth. Other dimensions are possible and depend on the intended rigidity and the used material.

Figure 4A:
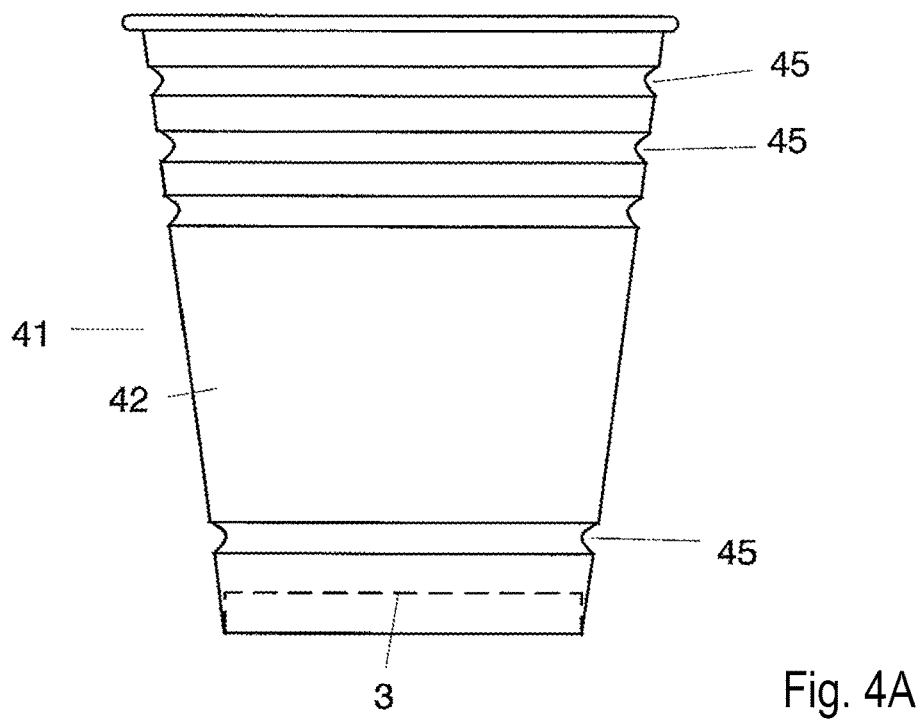
FIGS. 4A and 4B show schematic illustrations of the production process for a cup comprising at least one inwardly directed shaping according to the present invention.
Figure 4B:
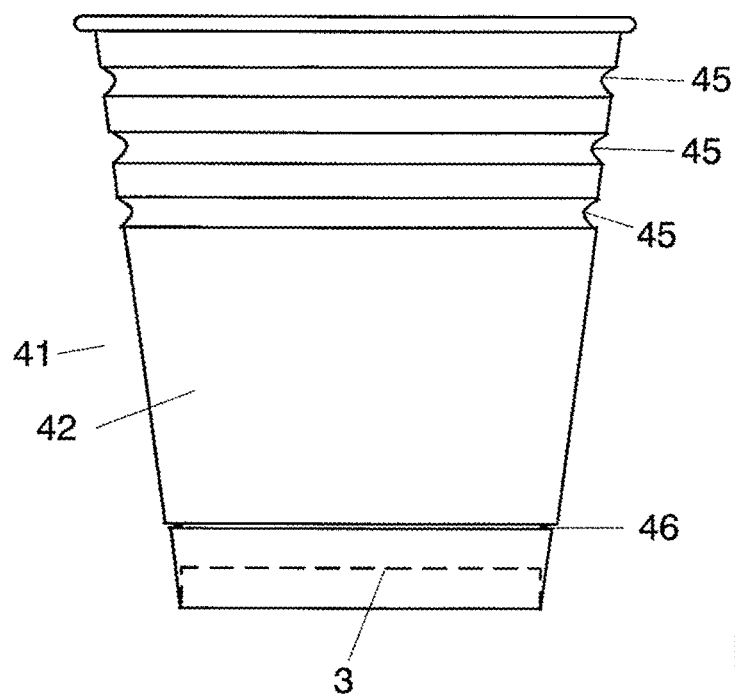
Figure 5A:
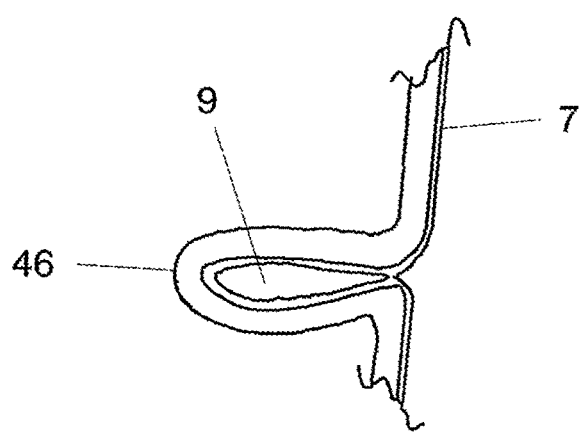
FIGS. 5A and 5B show partial cutaway views of different compressed shapings, one with a void and one a flat ring.
Figure 5B:
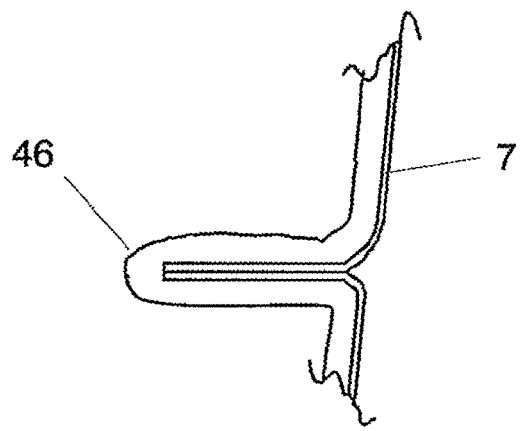

FIGS. 4A and 4B show another embodiment of the production process for a cup according to the present invention. The sidewall 42 of the depicted cup 41 comprises a plurality of inwardly directed shapings 45, here embossments. One of these shapings 45 is arranged close to the bottom 3. This bottommost shaping 45 compressed to a ring 46 and serves as stacking support.

In case a plurality of cups 41 is stacked into one another, the lower edge of these cups pushes against this ring 46. Thus, it is avoided that the upper cup is further pushed down. Thereby, it is prevented that cups stacked into one another strongly adhere to each other and cannot or can only hardly be denested.

It is preferred that the other shapings 45 illustrated in this embodiment are compressed as well. Furthermore, it is preferred, that these shapings 45 are outwardly directed.

Any combination of the two illustrated embodiments such as any arrangements 5 and 45, respectively, on the sidewall 2 and 42, respectively, are conceivable as well.

The sidewall 2 and 42, respectively, can be made from a different material. It is conceivable that plastic or any other fiber material is used.

It is possible that the sealable material is any heat-sealable coating, a sealing wax or the like. Sealable materials produced from renewable resources are conceivable. Among these materials are PLA or the like.

It is, furthermore, conceivable, that the shapings 5 and 45, respectively, only comprise segments capable to form a ring 6 together. Besides, it is conceivable that the shapings 5 and 45, respectively, are spiral-shaped, sectionally spiral-shaped or comprise a ring-shaped part.

Figure 6:
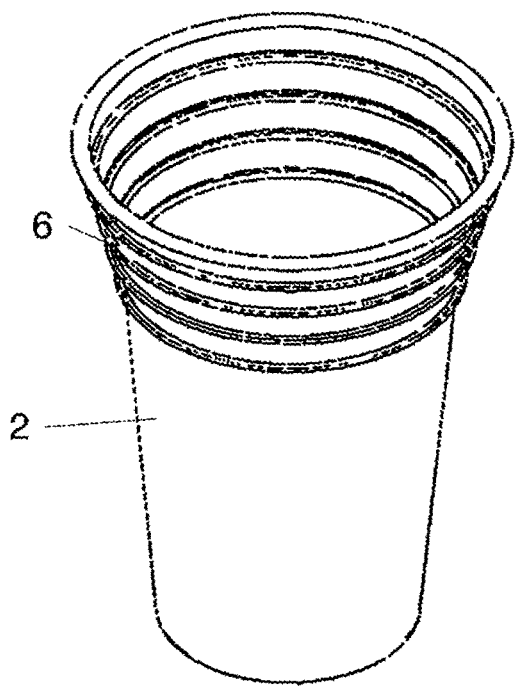
FIG. 6 shows a perspective view of a cup comprising a plurality of outwardly directed shaping and one inwardly directed shaping as stacking support, wherein the outwardly directed shapings are offset from one another in vertical direction.
Figure 7:
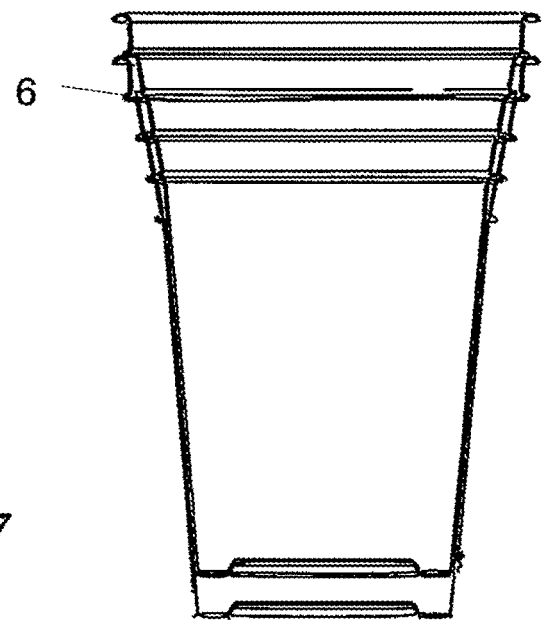
FIG. 7 shows a cutaway view of two cups stacked into one another.

Furthermore, it is conceivable, that a plurality of shapings 5 and 45, respectively, arranged preferably in the upper region of the cup vary in position and height. Thereby, shapings being positioned closer to the bottom are arranged further inside and comprise a lower depth, respectively. Due to this construction as illustrated in FIG. 6 the stackability of a plurality of cups is improved. The cups can be pushed into one another so that the stacking height is minimized. However, the cups can still be easily denested.

Furthermore, it is conceivable that an outer and optionally multi-layered sidewall 2 is wrapped around the cup and locks with the shapings 5 and 45, respectively. It is also possible that the outer sidewall is pulled over the cup.

Furthermore, it is conceivable that the inner sidewall comprises a flat surface whereas an outer sidewall comprises a or a multitude of shapings 5 and 45.

FIGS. 8A and 8B depict on the left hand side the inventive container 1 and shows on the right hand side an enlarged partial view of a first sidewall 2 of the container 1. The first sidewall 2 comprises at its upper end a rim 4 and is at its lower end connected to a base 8. The first sidewall 2 and the base 8 define the filling volume 14 of the inventive container. The first sidewall 2 is, in the present case, made from a flat cardboard-segment, which has been formed in the shape of a conus and whose opposite ends have been glued together. Near its top, the first sidewall comprises a shaping 5, which is directed outwardly, i.e. away from the filling volume 14. This shaping has been incorporated into the first sidewall plastically, i.e. by plastic deformation, for example by embossment. Parts of the inner surface of the shaping 5, especially edges 11 can be seen by the user of the container and represents a filling line 12.

The height H in which the filling line 12 is arranged, can be freely chosen according to the desired filling volume. The inventive container can comprise two or more shapings and thus two or more filling lines. In the present case, the shaping 5 has been compressed after it has been inserted into the first sidewall 2 and the flanks 13 and/or the edges 11 have been bonded, preferably glued or sealed to maintain the shaping in its compressed state. Due to the compression of the shaping 5 and its fixture in the compressed state, the filling line is very fine and preferably at least only very little liquid enters into the shaping. The filling line 12 does not reduce the inner diameter of the inventive container.

Figure 9A:
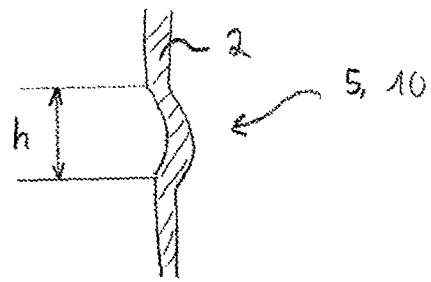
FIGS. 9A-9C show schematic illustrations of the compression of a shaping in a container according to the present invention.
Figure 9B:
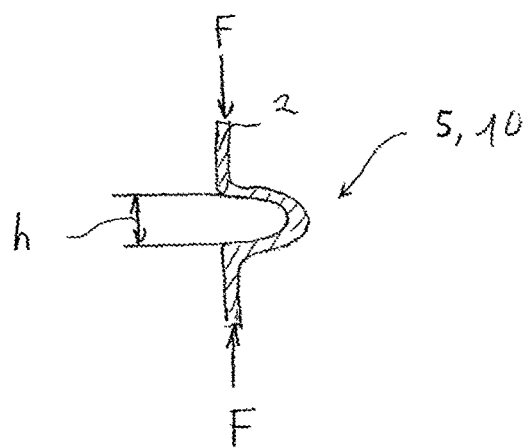
Figure 9C:
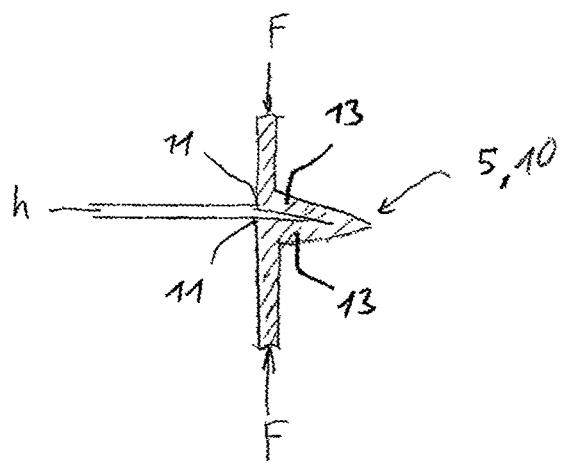

The compression of the shaping 5 is depicted in FIGS. 9A-9C. These figures show the compression of the height h of the shaping 5, 10. FIG. 9A shows the shaping, here an embossment 5, after it has been plastically introduced into the first sidewall 2. This shaping is subsequently compressed by the axial force F, so that the height h of the shaping decreases. FIG. 9B shows a first state of compression, which can be however the final state. FIG. 9C depicts, in comparison to FIG. 9B, a further compression of the embossment 5, in which the edges 12 of the shaping 5 lie on top of each other or at least adjacent to each other. In this state, the height h of the shaping is, in comparison to the embodiment according to FIG. 9B, even further reduced. In order to maintain the shaping 5 in the compressed state, the flanks 13 and/or the edges 11 of the shaping can be attached to each other, preferably glued or sealed.

Figure 3:
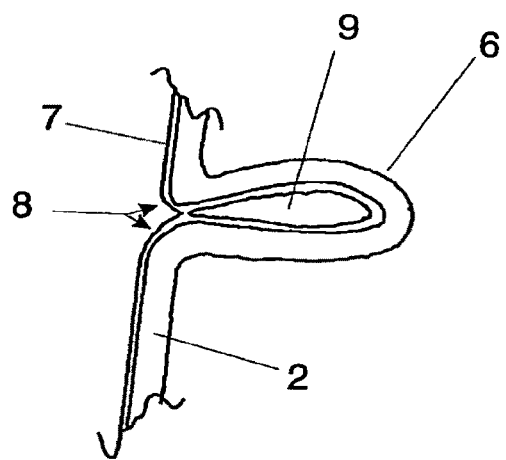
FIG. 3 shows a detailed partial cutaway view of a compressed shaping.
Figure 10:
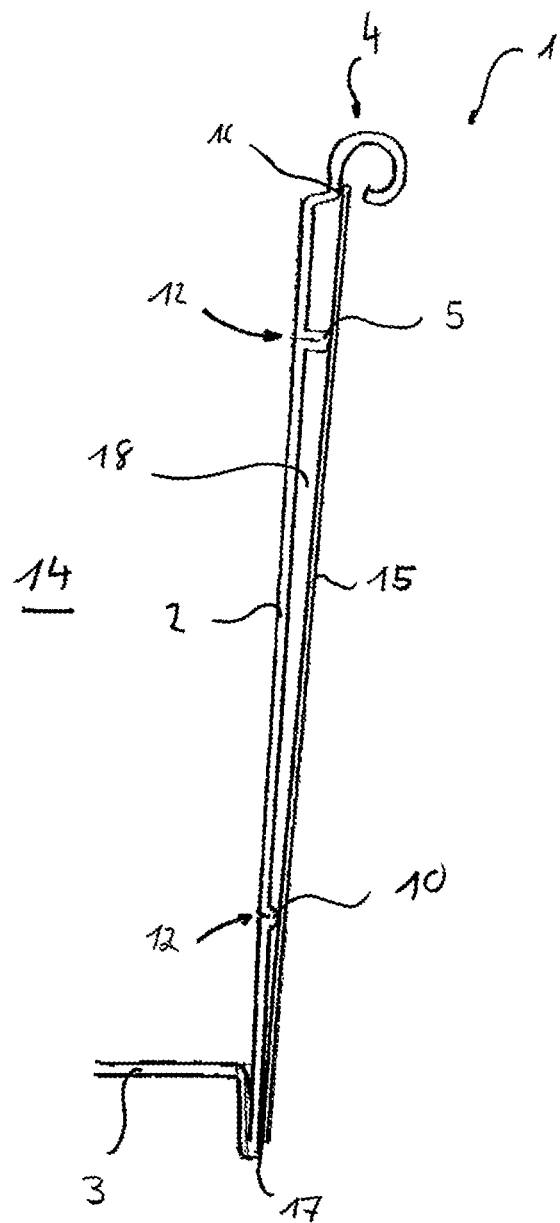
FIG. 10 shows a partial cutaway side view of an inventive container with compressed shapings.

An alternative embodiment of the inventive container is depicted in FIG. 10. Here, the container comprises two shapings 5, 10 and thus two filling lines 12. The lower filling line can be utilized to indicate an amount of powder or pellets to be added to the container. The upper filling line indicates the amount of liquid to be added to the container. The second sidewall 15 is utilized to maintain the shapings 5, 10 in their compressed state as depicted in FIG. 9b or 9c. This is done by compressing the shapings and holding the shaping in their compressed state, while the second sidewall is connected to the first sidewall either directly at the tip of the shaping 5, 10 or, as here depicted in FIG. 3, at the rim 4 and at the lower end of the first sidewall 2. As soon as this connection 16, 17 is ridged, the shapings 9, 10 are maintained in their compressed state by the second sidewall 3. The shapings 5, 10 function here also as spacers between the first and the second sidewall, so that an air gap 18 between the two sidewalls is maintained, even if pressure is applied to the second sidewall, for example by a user.

LIST OF REFERENCE SIGNS 1 container, cup
2 sidewall, first sidewall
3 bottom
4 rolled rim
5 shaping, embossment
6 compressed shaping, ring, flat ring
7 coating
8 edge of the shaping
9 void, void volume
10 second shaping, second embossment
11 edge of the shaping
12 natural fill line
13 flanks
14 filling volume
15 sidewall, second sidewall
16 connection
17 connection
41 container, cup
42 sidewall of the container, cup
45 shaping, embossment
46 compressed shaping, ring, flat ring
F compression force for the shaping, axial force
h height of the shaping
H height of the container, in which the shaping has been arranged

What is claimed is:

1. A process for the production of a container having a bottom and a sidewall attached to the bottom, the process comprising:
   forming a sidewall from flat paper or carton material, said sidewall having a first end and a second end wherein the first end is attached to the bottom and the sidewall has a rolled rim at the second end;
   forming at least one shaping having two opposing edges into the sidewall, the at least one shaping being at least partially ring-shaped and extending at least partially over the perimeter of the sidewall and wherein the at least one shaping is inwardly or outwardly directed;
   compressing the shaping in its height into a compressed shape so that a first edge of said two opposing edges contacts a second edge of said two opposing edges and said compressed shape provides said sidewall with increased structural rigidity; and
   securing a second sidewall to said at least one shaping, the compression of said at least one shaping is elastic and functions as a spring.

2. The process according to claim 1, wherein the compressing step generates a void volume defined by said at least one shaping.

3. The process according to claim 1, wherein the compressing step generates a flat profile of said at least one shaping.

4. The process according to claim 1, wherein said at least one shaping is shaped such that a rib is formed during the compressing step.

5. The process according to claim 1 further comprising joining said two opposing edges of the at least one shaping together by heat bonding, cold bonding, or hot sealing.

6. The process according to claim 1 further comprising applying a coating at least in a region of the sidewall proximate said two opposing edges of the at least one shaping, wherein the coating comprises a heat-sealable material to join the two opposing edges during the compressing step.

7. The process according to claim 1, wherein the compressing step results in a shaping wherein two opposing edges of the shaping are closely spaced and substantially form a flat inside surface of the sidewall.

8. A process for the production of a container having a bottom and at least one sidewall attached to the bottom, the process comprising:
   forming at least one sidewall from a material, said sidewall having a first end and a second end wherein the first end is attached to the bottom and the sidewall has a rolled rim at the second end, and wherein the material is selected from a group consisting of paper, carton, plastic, PLA, and a renewable and/or biodegradable resource;
   forming at least one shaping with two opposing edges into a first sidewall of said at least one sidewall, the at least one shaping extending at least partially over the perimeter of the first sidewall and wherein the at least one shaping is inwardly or outwardly directed;
   heating the at least one shaping;
   compressing the at least one shaping in its height into a compressed shaped providing said first sidewall with increased structural rigidity; and
   securing a second sidewall of said at least one sidewall to said at least one shaping, the compression of said at least one shaping is elastic and functions as a spring.

9. The process according to claim 8 further comprising coating said at least one shaping with a heat-sealable material.

10. The process according to claim 8 further comprising:
    forming a second shaping with two opposing edges into said first sidewall, said second shaping extending at least partially over the perimeter of said first sidewall and being inwardly or outwardly directed; and
    securing said second sidewall to said second shaping.

* * * * *